(12) United States Patent
Klose

(10) Patent No.: US 9,158,787 B2
(45) Date of Patent: Oct. 13, 2015

(54) SYSTEMS AND METHODS FOR BYTE-LEVEL OR QUASI BYTE-LEVEL SINGLE INSTANCING

(71) Applicant: CommVault Systems, Inc., Oceanport, NJ (US)

(72) Inventor: Michael F. Klose, Goch (DE)

(73) Assignee: Commvault Systems, Inc, Tinton Falls, NJ (US)

( * ) Notice: Subject to any disclaimer, the term of this patent is extended or adjusted under 35 U.S.C. 154(b) by 0 days.

(21) Appl. No.: 14/276,622

(22) Filed: May 13, 2014

(65) Prior Publication Data

US 2014/0250088 A1    Sep. 4, 2014

Related U.S. Application Data

(63) Continuation of application No. 13/855,514, filed on Apr. 2, 2013, now Pat. No. 8,725,687, which is a continuation of application No. 12/626,839, filed on Nov. 27, 2009, now Pat. No. 8,412,677.

(60) Provisional application No. 61/118,379, filed on Nov. 26, 2008.

(51) Int. Cl.
*G06F 17/30* (2006.01)
*G06F 11/14* (2006.01)

(52) U.S. Cl.
CPC ...... *G06F 17/30221* (2013.01); *G06F 11/1453* (2013.01); *G06F 17/30091* (2013.01);
(Continued)

(58) Field of Classification Search
CPC ............... G06F 17/30182; G06F 17/30073; G06F 17/30091; G06F 17/30212
USPC ......... 707/615–616, 634–635, 637, 692, 705; 711/103, 114, 129, 161, 165
See application file for complete search history.

(56) References Cited

U.S. PATENT DOCUMENTS 4,686,620 A     8/1987  Ng
4,713,755 A    12/1987  Worley, Jr. et al.
(Continued)

FOREIGN PATENT DOCUMENTS

EP    0259912 A1    3/1988
EP    0405926 A2    1/1991
(Continued)

OTHER PUBLICATIONS

Armstead et al., "Implementation of a Campwide Distributed Mass Storage Service: The Dream vs. Reality," IEEE, Sep. 11-14, 1995, pp. 190-199.
(Continued)

*Primary Examiner* — Frantz Coby
(74) *Attorney, Agent, or Firm* — Perkins Coie LLP

(57) ABSTRACT

Described in detail herein are systems and methods for deduplicating data using byte-level or quasi byte-level techniques. In some embodiments, a file is divided into multiple blocks. A block includes multiple bytes. Multiple rolling hashes of the file are generated. For each byte in the file, a searchable data structure is accessed to determine if the data structure already includes an entry matching a hash of a minimum sequence length. If so, this indicates that the corresponding bytes are already stored. If one or more bytes in the file are already stored, then the one or more bytes in the file are replaced with a reference to the already stored bytes. The systems and methods described herein may be used for file systems, databases, storing backup data, or any other use case where it may be useful to reduce the amount of data being stored.

20 Claims, 6 Drawing Sheets

(52) U.S. Cl.
CPC .... *G06F17/30156* (2013.01); *G06F 17/30159* (2013.01); *G06F 17/30212* (2013.01); *G06F 17/30073* (2013.01); *G06F 17/30182* (2013.01)

(56) References Cited

U.S. PATENT DOCUMENTS

| | | | |
|---|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,437,012 A | 7/1995 | Mahajan |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,604,862 A | 2/1997 | Midgely et al. |
| 5,606,686 A | 2/1997 | Tarui et al. |
| 5,619,644 A | 4/1997 | Crockett et al. |
| 5,628,004 A | 5/1997 | Gormley et al. |
| 5,634,052 A | 5/1997 | Morris |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,794,229 A | 8/1998 | French et al. |
| 5,806,057 A | 9/1998 | Gormley et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,822,780 A | 10/1998 | Schutzman |
| 5,862,325 A | 1/1999 | Reed et al. |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,073,133 A | 6/2000 | Chrabaszcz |
| 6,076,148 A | 6/2000 | Kedem |
| 6,094,416 A | 7/2000 | Ying |
| 6,125,369 A | 9/2000 | Wu et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,252 B1 | 10/2001 | Raz |
| 6,324,544 B1 | 11/2001 | Alam et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,513,051 B1 | 1/2003 | Bolosky et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,609,157 B2 | 8/2003 | Deo et al. |
| 6,609,183 B2 | 8/2003 | Ohran |
| 6,609,187 B1 | 8/2003 | Merrell et al. |
| 6,658,526 B2 | 12/2003 | Nguyen et al. |
| 6,675,177 B1 | 1/2004 | Webb |
| 6,704,730 B2 | 3/2004 | Moulton et al. |
| 6,745,304 B2 | 6/2004 | Playe |
| 6,757,699 B2 | 6/2004 | Lowry |
| 6,757,794 B2 | 6/2004 | Cabrera et al. |
| 6,795,903 B2 | 9/2004 | Schultz et al. |
| 6,810,398 B2 | 10/2004 | Moulton |
| 6,862,674 B2 | 3/2005 | Dice et al. |
| 6,865,655 B1 | 3/2005 | Andersen |
| 6,868,417 B2 | 3/2005 | Kazar et al. |
| 6,889,297 B2 | 5/2005 | Krapp et al. |
| 6,901,493 B1 | 5/2005 | Maffezzoni |
| 6,912,645 B2 | 6/2005 | Dorward et al. |
| 6,928,459 B1 | 8/2005 | Sawdon et al. |
| 6,952,758 B2 | 10/2005 | Chron et al. |
| 6,959,368 B1 | 10/2005 | St. Pierre et al. |
| 6,973,553 B1 | 12/2005 | Archibald, Jr. et al. |
| 6,976,039 B2 | 12/2005 | Chefalas et al. |
| 6,993,162 B2 | 1/2006 | Stephany et al. |
| 7,017,113 B2 | 3/2006 | Bourbakis et al. |
| 7,035,876 B2 | 4/2006 | Kawai et al. |
| 7,035,880 B1 | 4/2006 | Crescenti et al. |
| 7,035,943 B2 | 4/2006 | Yamane et al. |
| 7,085,904 B2 | 8/2006 | Mizuno et al. |
| 7,089,383 B2 | 8/2006 | Ji et al. |
| 7,089,395 B2 | 8/2006 | Jacobson et al. |
| 7,103,740 B1 | 9/2006 | Colgrove et al. |
| 7,107,418 B2 | 9/2006 | Ohran |
| 7,111,173 B1 | 9/2006 | Scheidt |
| 7,117,246 B2 | 10/2006 | Christenson et al. |
| 7,139,808 B2 | 11/2006 | Anderson et al. |
| 7,143,091 B2 | 11/2006 | Charnock et al. |
| 7,191,290 B1 | 3/2007 | Ackaouy et al. |
| 7,200,604 B2 | 4/2007 | Forman et al. |
| 7,200,621 B2 | 4/2007 | Beck et al. |
| 7,246,272 B2 | 7/2007 | Cabezas et al. |
| 7,272,606 B2 | 9/2007 | Borthakur et al. |
| 7,287,252 B2 | 10/2007 | Bussiere et al. |
| 7,310,655 B2 | 12/2007 | Dussud |
| 7,320,059 B1 | 1/2008 | Armangau et al. |
| 7,325,110 B2 | 1/2008 | Kubo et al. |
| 7,330,997 B1 | 2/2008 | Odom |
| 7,343,459 B2 | 3/2008 | Prahlad et al. |
| 7,376,805 B2 | 5/2008 | Stroberger et al. |
| 7,383,304 B2 | 6/2008 | Shimada et al. |
| 7,383,462 B2 | 6/2008 | Osaki et al. |
| 7,395,282 B1 | 7/2008 | Crescenti et al. |
| 7,409,522 B1 | 8/2008 | Fair et al. |
| 7,444,382 B2 | 10/2008 | Malik |

(56) References Cited

U.S. PATENT DOCUMENTS

| | | | |
|---|---|---|---|
| 7,444,387 B2 | 10/2008 | Douceur et al. | |
| 7,478,113 B1 | 1/2009 | De Spiegeleer et al. | |
| 7,480,782 B2 | 1/2009 | Garthwaite | |
| 7,487,245 B2 | 2/2009 | Douceur et al. | |
| 7,490,207 B2 | 2/2009 | Amarendran et al. | |
| 7,493,314 B2 | 2/2009 | Huang et al. | |
| 7,496,604 B2 | 2/2009 | Sutton, Jr. et al. | |
| 7,512,745 B2 | 3/2009 | Gschwind et al. | |
| 7,519,726 B2 | 4/2009 | Palliyil et al. | |
| 7,533,331 B2 | 5/2009 | Brown et al. | |
| 7,568,080 B2 | 7/2009 | Prahlad et al. | |
| 7,603,529 B1 | 10/2009 | MacHardy et al. | |
| 7,613,748 B2 | 11/2009 | Brockway et al. | |
| 7,617,297 B2 | 11/2009 | Bruce et al. | |
| 7,631,194 B2 | 12/2009 | Wahlert et al. | |
| 7,636,824 B1 | 12/2009 | Tormasov | |
| 7,647,462 B2 | 1/2010 | Wolfgang et al. | |
| 7,657,550 B2 | 2/2010 | Prahlad et al. | |
| 7,661,028 B2 | 2/2010 | Erofeev | |
| 7,668,884 B2 | 2/2010 | Prahlad et al. | |
| 7,676,590 B2 | 3/2010 | Silverman et al. | |
| 7,685,126 B2 | 3/2010 | Patel et al. | |
| 7,685,177 B1 | 3/2010 | Hagerstrom et al. | |
| 7,685,384 B2 | 3/2010 | Shavit | |
| 7,685,459 B1 | 3/2010 | De Spiegeleer et al. | |
| 7,698,699 B2 | 4/2010 | Rogers et al. | |
| 7,721,292 B2 | 5/2010 | Frasier et al. | |
| 7,747,579 B2 | 6/2010 | Prahlad et al. | |
| 7,747,659 B2 | 6/2010 | Bacon et al. | |
| 7,778,979 B2 | 8/2010 | Hatonen et al. | |
| 7,788,230 B2 | 8/2010 | Dile et al. | |
| 7,814,142 B2 | 10/2010 | Mamou et al. | |
| 7,818,287 B2 | 10/2010 | Torii et al. | |
| 7,818,495 B2 | 10/2010 | Tanaka et al. | |
| 7,818,531 B2 | 10/2010 | Barrall | |
| 7,831,707 B2 | 11/2010 | Bardsley | |
| 7,831,795 B2 | 11/2010 | Prahlad et al. | |
| 7,840,537 B2 | 11/2010 | Gokhale et al. | |
| 7,853,750 B2 | 12/2010 | Stager | |
| 7,856,414 B2 | 12/2010 | Zee | |
| 7,865,678 B2 | 1/2011 | Arakawa et al. | |
| 7,870,105 B2 | 1/2011 | Arakawa et al. | |
| 7,870,486 B2 | 1/2011 | Wang et al. | |
| 7,873,599 B2 | 1/2011 | Ishii et al. | |
| 7,873,806 B2 | 1/2011 | Prahlad et al. | |
| 7,882,077 B2 | 2/2011 | Gokhale et al. | |
| 7,921,077 B2 | 4/2011 | Ting et al. | |
| 7,953,706 B2 | 5/2011 | Prahlad et al. | |
| 7,962,452 B2 | 6/2011 | Anglin | |
| 8,037,028 B2 | 10/2011 | Prahlad et al. | |
| 8,041,907 B1 | 10/2011 | Wu et al. | |
| 8,054,765 B2 | 11/2011 | Passey et al. | |
| 8,055,618 B2 | 11/2011 | Anglin | |
| 8,055,627 B2 | 11/2011 | Prahlad et al. | |
| 8,055,745 B2 | 11/2011 | Atluri | |
| 8,086,799 B2 | 12/2011 | Mondal et al. | |
| 8,108,429 B2 | 1/2012 | Sim-Tang et al. | |
| 8,112,357 B2 | 2/2012 | Mueller et al. | |
| 8,131,687 B2 | 3/2012 | Bates et al. | |
| 8,140,786 B2 | 3/2012 | Bunte et al. | |
| 8,156,092 B2 | 4/2012 | Hewett et al. | |
| 8,156,279 B2 | 4/2012 | Tanaka et al. | |
| 8,161,003 B2 | 4/2012 | Kavuri | |
| 8,165,221 B2 | 4/2012 | Zheng et al. | |
| 8,166,263 B2 | 4/2012 | Prahlad et al. | |
| 8,170,994 B2 | 5/2012 | Tsaur et al. | |
| 8,190,823 B2 | 5/2012 | Waltermann et al. | |
| 8,190,835 B1 | 5/2012 | Yueh | |
| 8,219,524 B2 | 7/2012 | Gokhale | |
| 8,234,444 B2 | 7/2012 | Bates et al. | |
| 8,271,992 B2 | 9/2012 | Chatley et al. | |
| 8,285,683 B2 | 10/2012 | Prahlad et al. | |
| 8,295,875 B2 | 10/2012 | Masuda | |
| 8,296,260 B2 | 10/2012 | Ting et al. | |
| 8,346,730 B2 | 1/2013 | Srinivasan et al. | |
| 8,380,957 B2 | 2/2013 | Prahlad et al. | |
| 8,392,677 B2 | 3/2013 | Bunte et al. | |
| 8,401,996 B2 | 3/2013 | Muller et al. | |
| 8,412,677 B2 * | 4/2013 | Klose | 707/634 |
| 8,412,682 B2 | 4/2013 | Zheng et al. | |
| 8,548,953 B2 | 10/2013 | Wong et al. | |
| 8,578,120 B2 | 11/2013 | Attarde et al. | |
| 8,626,723 B2 | 1/2014 | Ben-Shaul et al. | |
| 8,712,969 B2 | 4/2014 | Prahlad et al. | |
| 8,725,687 B2 * | 5/2014 | Klose | 707/637 |
| 2002/0055972 A1 | 5/2002 | Weinman | |
| 2002/0099806 A1 | 7/2002 | Balsamo et al. | |
| 2002/0107877 A1 | 8/2002 | Whiting et al. | |
| 2003/0004922 A1 | 1/2003 | Schmidt et al. | |
| 2003/0097359 A1 | 5/2003 | Ruediger | |
| 2003/0110190 A1 | 6/2003 | Achiwa et al. | |
| 2003/0167318 A1 | 9/2003 | Robbin et al. | |
| 2003/0172368 A1 | 9/2003 | Alumbaugh et al. | |
| 2003/0177149 A1 | 9/2003 | Coombs | |
| 2003/0236763 A1 | 12/2003 | Kilduff | |
| 2004/0093259 A1 | 5/2004 | Pych | |
| 2004/0148306 A1 | 7/2004 | Moulton et al. | |
| 2004/0230817 A1 | 11/2004 | Ma | |
| 2005/0033756 A1 | 2/2005 | Kottomtharayil et al. | |
| 2005/0066190 A1 | 3/2005 | Martin | |
| 2005/0203864 A1 | 9/2005 | Schmidt et al. | |
| 2005/0234823 A1 | 10/2005 | Schimpf | |
| 2005/0262110 A1 | 11/2005 | Gu et al. | |
| 2005/0262193 A1 | 11/2005 | Mamou et al. | |
| 2005/0286466 A1 | 12/2005 | Tagg et al. | |
| 2006/0047894 A1 | 3/2006 | Okumura | |
| 2006/0056623 A1 | 3/2006 | Gligor et al. | |
| 2006/0089954 A1 | 4/2006 | Anschutz | |
| 2006/0095470 A1 | 5/2006 | Cochran et al. | |
| 2006/0174112 A1 | 8/2006 | Wray | |
| 2006/0224846 A1 | 10/2006 | Amarendran et al. | |
| 2007/0022145 A1 | 1/2007 | Kavuri | |
| 2007/0136200 A1 | 6/2007 | Frank et al. | |
| 2007/0156998 A1 | 7/2007 | Gorobets | |
| 2007/0271316 A1 | 11/2007 | Hollebeek | |
| 2008/0005141 A1 * | 1/2008 | Zheng et al. | 707/101 |
| 2008/0082736 A1 | 4/2008 | Chow et al. | |
| 2008/0091881 A1 | 4/2008 | Brittain et al. | |
| 2008/0098083 A1 | 4/2008 | Shergill et al. | |
| 2008/0162467 A1 | 7/2008 | Fuchs | |
| 2008/0162518 A1 | 7/2008 | Bollinger et al. | |
| 2008/0243914 A1 | 10/2008 | Prahlad et al. | |
| 2009/0012984 A1 | 1/2009 | Ravid et al. | |
| 2009/0049260 A1 | 2/2009 | Upadhyayula | |
| 2009/0063528 A1 | 3/2009 | Yueh | |
| 2009/0106369 A1 | 4/2009 | Chen et al. | |
| 2009/0106480 A1 | 4/2009 | Chung | |
| 2009/0112870 A1 | 4/2009 | Ozzie et al. | |
| 2009/0132764 A1 | 5/2009 | Moll et al. | |
| 2009/0150498 A1 | 6/2009 | Branda et al. | |
| 2009/0268903 A1 | 10/2009 | Bojinov et al. | |
| 2009/0319534 A1 | 12/2009 | Gokhale | |
| 2010/0082529 A1 | 4/2010 | Mace et al. | |
| 2010/0082672 A1 | 4/2010 | Kottomtharayil et al. | |
| 2010/0088296 A1 | 4/2010 | Periyagaram et al. | |
| 2010/0161554 A1 | 6/2010 | Datuashvili et al. | |
| 2010/0223441 A1 | 9/2010 | Lillibridge et al. | |
| 2011/0125720 A1 | 5/2011 | Jayaraman | |
| 2012/0084524 A1 | 4/2012 | Gokhale et al. | |
| 2012/0271793 A1 | 10/2012 | Gokhale | |
| 2013/0179405 A1 | 7/2013 | Bunte et al. | |
| 2013/0218842 A1 | 8/2013 | Muller et al. | |
| 2013/0226883 A1 | 8/2013 | Klose | |
| 2013/0262386 A1 | 10/2013 | Kottomtharayil et al. | |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |

(56) References Cited

FOREIGN PATENT DOCUMENTS

| WO | WO-9513580 A1 | 5/1995 |
|---|---|---|
| WO | WO-9912098 A1 | 3/1999 |
| WO | WO-2006052872 A2 | 5/2006 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Commvault Systems, Inc., "Continuous Data Replicator 7.0," Product Data Sheet, 2007, 6 pages.

CommVault Systems, Inc., "Deduplication—How To,"; <http://documentation.commvault.com/commvault/release_8_0_0/books_online_1/english_US;/features/single_instance/single_instance_how_to.htm>, earliest known publication date:; Jan. 26, 2009, 7 pages.

CommVault Systems, Inc., "Deduplication,"; <http://documentation.commvault.com/commvault/release_8_0_0/books_online_1/english_US;/features/single_instance/single_instance.htm>, earliest known publication date: Jan. 26, 2009, 9; pages.

Diligent Technologies "HyperFactor," <http://www.diligent.com/products:protecTIER-1:HyperFactor-1>, Internet accessed on Dec. 5, 2008, 2 pages.

Eitel, "Backup and Storage Management in Distributed Heterogeneous Environments," *IEEE*, Jun. 12-16, 1994, pp. 124-126.

Enterprise Storage Management, "What Is Hierarchical Storage Management?", Jun. 19, 2005, pp. 1, http://web.archive.org/web/20050619000521/hhttp://www.enterprisestoragemanagement.com/faq/hierarchical-storage-management-shtml.

Enterprise Storage Management, What Is a Incremental Backup?, Oct. 26, 2005, pp. 1-2, http://web.archive.org/web/w0051026010908/http://www.enterprisestoragemanagement.com/faq/incremental-backup.shtml.

Extended European Search Report for EP07865192.4; Date of Mailing May 2, 2013, 7 pages.

Federal Information Processing Standards Publication 180-2, "Secure Hash Standard", Aug. 1, 2002, ; <http://csrc.nist.gov/publications/fips/fips1 80-2/fips 1 80-2withchangenotice.pdf>, 83 pages.

Gait, J., "The Optical File Cabinet: A Random-Access File System for Write-Once Optical Disks," *IEEE Computer*, vol. 21, No. 6, pp. 11-22 (Jun. 1988).

Geer, D., "Reducing the Storage Burden Via Data Deduplication," IEEE, Computer Journal, vol. 41, Issue 12, Dec. 2008, pp. 15-17.

Handy, Jim, "The Cache Memory Book: The Authoritative Reference on Cache Design," Second Edition, 1998, pp. 64-67 and pp. 204-205.

International Preliminary Report on Patentability and Written Opinion for PCT/US2007/086421, Mail Date Jun. 18, 2009, 8 pages.

International Preliminary Report on Patentability and Written Opinion for PCT/US2011/054378, Mail Date Apr. 11, 2013, 5 pages.

International Search Report and Written Opinion for PCT/US07/86421, Mail Date Apr. 18, 2008, 9 pages.

International Search Report for Application No. PCT/US09/58137, Mail Date Dec. 23, 2009, 14 pages.

International Search Report for Application No. PCT/US10/34676, Mail Date Nov. 29, 2010, 9 pages.

International Search Report for Application No. PCT/US11/54378, Mail Date May 2, 2012, 8 pages.

Jander, M., "Launching Storage-Area Net," *Data Communications*, US, McGraw Hill, NY, vol. 27, No. 4 (Mar. 21, 1998), pp. 64-72.

Kornblum, Jesse, "Identifying Almost Identical Files Using Context Triggered Piecewise Hashing," www.sciencedirect.com, Digital Investigation 3S (2006), pp. S91-S97.

Lortu Software Development, "Kondar Technology-Deduplication," <http://www.lortu.com/en/deduplication.asp>, Internet accessed on Dec. 5, 2008, 3 pages.

Menezes et al., "Handbook of Applied Cryptography", CRC Press, 1996, <http://www.cacr.math.uwaterloo.ca/hac/aboutlchap9.pdf>, 64 pages.

Microsoft, "Computer Dictionary", p. 249, Fifth Edition, 2002, 3 pages.

Microsoft, "Computer Dictionary", pp. 142, 150, 192, and 538, Fifth Edition, 2002, 6 pages.

Overland Storage, "Data Deduplication," <http://www.overlandstorage.com/topics/data_deduplication.html>, Internet accessed on Dec. 5, 2008, 2 pages.

Quantum Corporation, "Data De-Duplication Background: A Technical White Paper," May 2008, 13 pages.

Rosenblum et al., "The Design and Implementation of a Log-Structured File System," *Operating Systems Review SIGOPS*, vol. 25, No. 5, New York, US, pp. 1-15 (May 1991).

SearchStorage, "File System", Nov. 1998, <http://searchstorage.techtarget.com/definition/file-system>, 10 pages.

Sharif, A., "Cache Memory," Sep. 2005, http://searchstorage.techtarget.com/definition/cache-memory, pp. 1-26.

Webopedia, "Cache," Apr. 11, 2001, http://web.archive.org/web/20010411033304/http://www.webopedia.com/TERM/c/cache.html pp. 1-4.

Webopedia, "Data Duplication", Aug. 31, 2006, <http://web.archive.org/web/20060913030559/http://www.webopedia.com/TERMID/data_deduplication.html>, 2 pages.

Canada Office Action for Application No. 2706007, mailing date Jul. 30, 2014, 2 pages.

\* cited by examiner

SYSTEMS AND METHODS FOR BYTE-LEVEL OR QUASI BYTE-LEVEL SINGLE INSTANCING

CROSS REFERENCE TO RELATED APPLICATIONS

This application is a continuation of U.S. patent application Ser. No. 13/855,514, filed on Apr. 2, 2013, entitled SYSTEMS AND METHODS FOR BYTE-LEVEL OR QUASI BYTE-LEVEL SINGLE INSTANCING, now U.S. Pat. No. 8,725,687, which is a continuation of U.S. patent application Ser. No. 12/626,839, filed on Nov. 27, 2009, now U.S. Pat. No. 8,412,677, entitled SYSTEMS AN METHODS FOR BYTE-LEVEL OR QUASI BYTE-LEVEL SINGLE INSTANCING, which claims priority to and the benefit of U.S. Patent Application No. 61/118,379, filed on Nov. 26, 2008, entitled SYSTEMS AND METHODS FOR BYTE-LEVEL OR QUASI BYTE-LEVEL SINGLE INSTANCING, each of which is incorporated by reference in its entirety.

BACKGROUND

Conventional single instancing solutions are typically file-based or block-based.

File-based means that, for example if an Excel spread sheet file on a disk is copied to another location on the disk, on a single instanced data store, it would be detected that they contain the same contents and only one reference to the file would be kept regardless of how many times it appears on the disk (or other disks) and under which filesystems.

However, if this Excel spreadsheet is opened and only one number is changed then it is saved, even though 99% of the document is still the same, file-level single instancing would not work.

Block-level single instancing would help here. Block-level single instancing chops up files into blocks and even if one block (in the example where the number got changed) doesn't match, the other blocks still do, so they can be single instanced.

However, if new rows are inserted, or using a different example, a file e.g., a Word document, that is split into blocks of certain fixed block sizes, if somewhere at the start a single letter, a word, or a sentence is inserted, everything below it will shift and all the blocks will become different even though only a small change in the file occurred.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
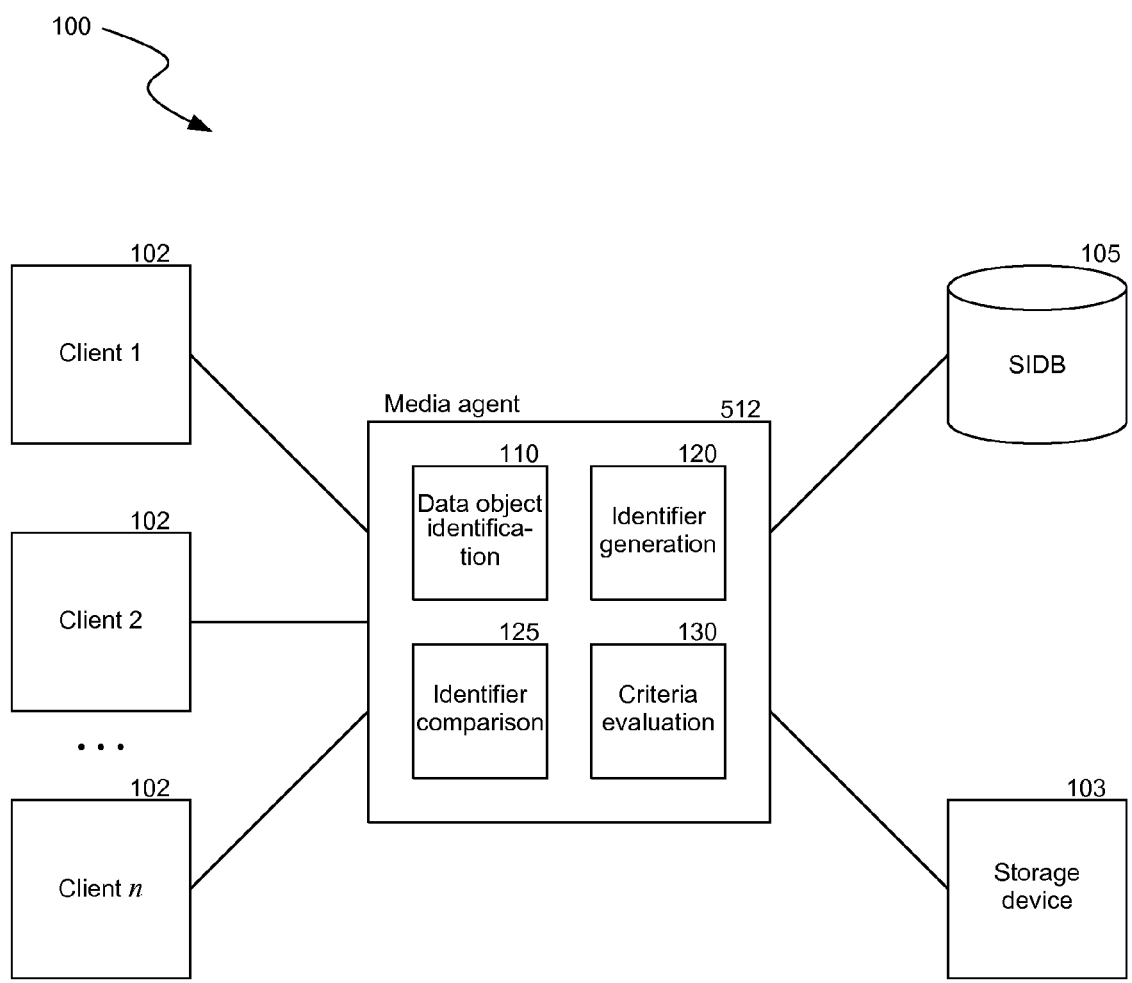
FIG. 1 is a block diagram illustrating an example environment in which aspects of the invention may be configured to operate.

The headings provided herein are for convenience only and do not necessarily affect the scope or meaning of the claimed invention.

Single Instancing and Overview

One purpose of single instancing (alternatively referred to herein as deduplicating) is to minimize storage space and to avoid storing duplicate data multiple times.

One challenge of performing single instancing on a byte-level is finding matches. With a block-level where a strong hash function is used, either the whole block can be used, or nothing at all. Also the strong hash function (such as MD5 or SHA1) may present a problem in that a sequence like '1234567890' and a hash of length 4, to calculate the hash of '1234', '2345', '3456', '4567', '5678', '6789', '7890' requires each byte (7*4=28 bytes here) to be read again and again.

Using a rolling hash reduces the number of reads to '1234', −1+5, −2+6, −3+7, −4+8, −5+9, −6+0; or to 16. Rolling hashes reduce hash calculation time from one byte to the next which is needed in byte-level single instancing from $O(n)$ to $O(1)$. Even when a hash is present, a hash only allows one to verify in one shot if a set number of bytes might be equal to another set number of bytes. It breaks down if the number of bytes one wants to compare becomes variable.

In addition, when wanting to compare whether or not data of a variable size matches anything already encountered, how to do the comparison a) the size of the data can be very small or extremely large and b) it may be difficult to ascertain what the size of the data to compare is.

This is where the 'power of 2' hashes can be used. By that, a number of hashes is stored rather than just one, where the amount of data hashed increases by powers of 2. Rolling hashes may not be reliable though, so the data needs to be verified. If one would just link to the data stored in different files, one would need to open and close hundreds and hundreds of files every minute. This may not work very well.

This document describes systems and methods that provide for storing data in a manner employing byte-level or quasi byte-level single instancing so that individual files or data objects can be read in a random access fashion, modified and space can be reclaimed for reuse.

In some embodiments, file names or other metadata of files may be stored. In other embodiments, such metadata may not be stored. In these embodiments, however, the data of a file can be referenced by way of a reference pointer.

This makes the system useful not only for filesystems, but anywhere where data needs to be referenced and it is desired to reduce the amount of data storage. This approach would also be useful for storing blob data or large strings in databases, or as in a use case of storing backup data.

The system will store data in blocks, however not the whole block needs to match for single instancing; e.g., only the start of the sequence of data stored within a block needs to match in order for the block to become usable. Block sizes of data can be very small. The smaller the block size, the better the single instancing achieved, however also the higher the overhead. Blocks can reference other blocks, by way of direct addressing and a length (e.g. block 10 can reference block 2 starting at offset 26 for a length of 200 bytes source bytes). Due to this referencing, even though the block size is very small, one block can refer to gigabytes of actual data (from now on referred to as "source data"). One implementation can also have pseudo blocks which are not coded data blocks, but rather links to inside other coded data blocks. This may be useful to put a frequently used offset of an actual block into the search tree. A byte-level or quasi byte-level single instancing method allows single instancing of a block even though the entire block does not match another block (only just the beginning, or with a reference even only a part within it). This differs from block- or file-level single instancing where if data shifts by a byte, a lot (if not all) blocks become out of alignment and cannot be used. With byte-level or quasi byte-level single instancing, the maximum amount of data which cannot be single instanced due to such a data shift is one block length (in the byte rather than kilobyte range). Blocks may further be stored within a search tree. Pseudo blocks may be inserted into the search tree, but do not have to be. The search tree allows for random access of desired blocks.

This search tree should allow direct addressing of the nodes—so that one node or leaf of the search tree can immediately link to another node or leaf of the search tree, no matter where in the search tree the referenced block is. The resulting data structure may be considered to be a graph. This data structure will be referred to herein as the "search tree." In some embodiments, a node should not refer to any node that was added after the node so as to avoid cyclic dependencies.

The search tree portion will contain coded data blocks in a sorted fashion so it is easily traversable. Each block contains meta information—for example but not limited to: the number of references, which byte within the block contains the half way mark of the data and what the source offset is, and hashes.

In some embodiments, the data is to be stored in very few files (maybe only one file). This helps during verification that is required, and adds the benefit that any number of bytes from a sequence already existing can be used—also this adds the advantage of being able to update the reference counts of the individual code blocks while traversing the data. In addition, storing the data in this fashion compresses the data on the fly.

The data should be stored in a sorted format—so, in some embodiments, that data is stored in a search tree. Any suitable data structure may be used. The data structure should be a data structure where any node of the search tree can reference other nodes of the search tree regardless of where in the search tree the other nodes are, possibly subject to some exceptions. In some embodiments, a first node of the search tree can reference data in any other node excepting nodes that are descendants (e.g., children, grandchildren, etc.) of the first node.

A suitable mechanism of how to compare and sort two data blocks that can represent data gigabytes in length (though the actual blocks are only a couple of bytes long) is needed.

In some embodiments, performing byte-level or quasi byte-level single instancing uses the following method: by using power of 2 rolling hashes to sort a large number of small blocks of data representing a very large amount of data into a search tree where each node can reference data in other nodes, for the purpose of storing data in a compressed and single instanced format, whereby it is still possible to easily jump to any point within a file and read from it, and also being able to modify and delete data from this data structure.

The advantages of byte-level or quasi byte-level single instancing are numerous: a lot more data than previously with block-level or file-level can be single instanced and an automatic compression is achieved at the same time. Since hashes are in general not relied upon (they may be used to detect repeat occurrences) there are generally also no problems of hash collisions—which could cause data corruption in previous approaches.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The following discussion provides a brief, general description of a suitable specialized environment in which the invention can be implemented. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular phones, mobile phones, and/or mobile devices, multi-processor systems, microprocessor-based or programmable consumer electronics, set-top boxes, network PCs, mini-computers, mainframe computers, and the like. The terms "computer," "server," "host," "host system," and the like are generally used interchangeably herein, and refer to any of the above devices and systems, as well as any data processor.

While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), and/or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Additional Features

With block-level and file-level single instancing, there is only very little data (the strong hash) to check against a hash database, one lookup every 128 KB or more—not looking for a match for every single byte read. How to do this fast and quickly determining the best match is one problem.

Databases store data within trees also; however they store the complete row data. In some embodiments, the data is being divided up into tiny pieces, compressing it into the tree and making all the parts searchable. While hashes are used—they are not relied on, they are just used to find potential matches.

Suitable Data Structures

The search tree should have the following capabilities: 1) as balanced as possible with minimal overhead when adding new code blocks; and 2) while the positions of blocks within the search tree may change, the block should be addressable under its old location even if the location in the search tree changes due to inserts/deletions.

In some embodiments, the data structure is "skipped lists." A skip list is a probabilistic data structure, based on multiple parallel, sorted linked lists, with efficiency comparable to a binary search tree (order log n average time for most operations). However, another data structure, for example a "red-black tree" linking to coded blocks, may be used.

One advantage of skipped lists is that it remains mostly balanced, does not require reordering of nodes when items are inserted/removed (meaning absolute locations will remain the same), and the sorted linked list property of it also lends itself well to objectives of byte-level or quasi byte-level single instancing. It also makes locking of nodes easier and keeps the rest of the search tree open in case of concurrent accesses. An entire block can be bypassed by providing alternate paths during locking and still have a valid search tree.

An important consideration is how to store the data within the search tree and how to determine if one block (which can refer to gigabytes of source data) is smaller, equal or greater than an existing block.

In some embodiments, the method used is rolling hashes. A rolling hash is a hash function where the input is hashed in a window that moves through the input. In some embodiments, Robin-Karp rolling hash techniques may be used.

Rolling hashes have the property that given an input stream and a fixed number of n bytes for which a hash is to be created, that it is typically very easy and fast to get the next hash when the next input character is read (example: sequence is '1234567'—a hash of 4 bytes is taken, so hashes of '1234', '2345', '3456', '4567' need to be calculated). With other hash mechanisms to calculate a new hash, the hash needs to be calculated using all n bytes, for a rolling hash, the hash is only dependent on the previous hash and the character dropping out and the character coming in, which may lead to speed advantages over other techniques.

In some embodiments, there is not one rolling hash, but several—it is the 'hashes of the powers of 2'—a hash of the first 64 source bytes, the hash of the first 128 source bytes, a hash of the first 256 source bytes, etc.

Since there is a certain minimum number of bytes a sequence of bytes should have in order to be worthwhile to single instance, the hash of this minimum sequence length would be an additional hash.

It may have advantages if this minimum hash is itself a power of two (say 32 bytes length=2^5). Anything below this may not be single instanceable. Not all 'power of 2' hashes for a block will be stored. The minimum sequence hash is stored and is the first sort criteria. However, the next power of two stored for a block could be determined by the logarithm of the amount of source bytes stored in the first half of the block, though other optimizations could also be applied.

In some embodiments, not all blocks are inserted into a search tree. If a code block fills less than half the amount of space, it will get a storage location, but may not be included into the search tree. This algorithm could be varied to ¾, or the whole or any other fraction without changing the invention.

Figure 5:
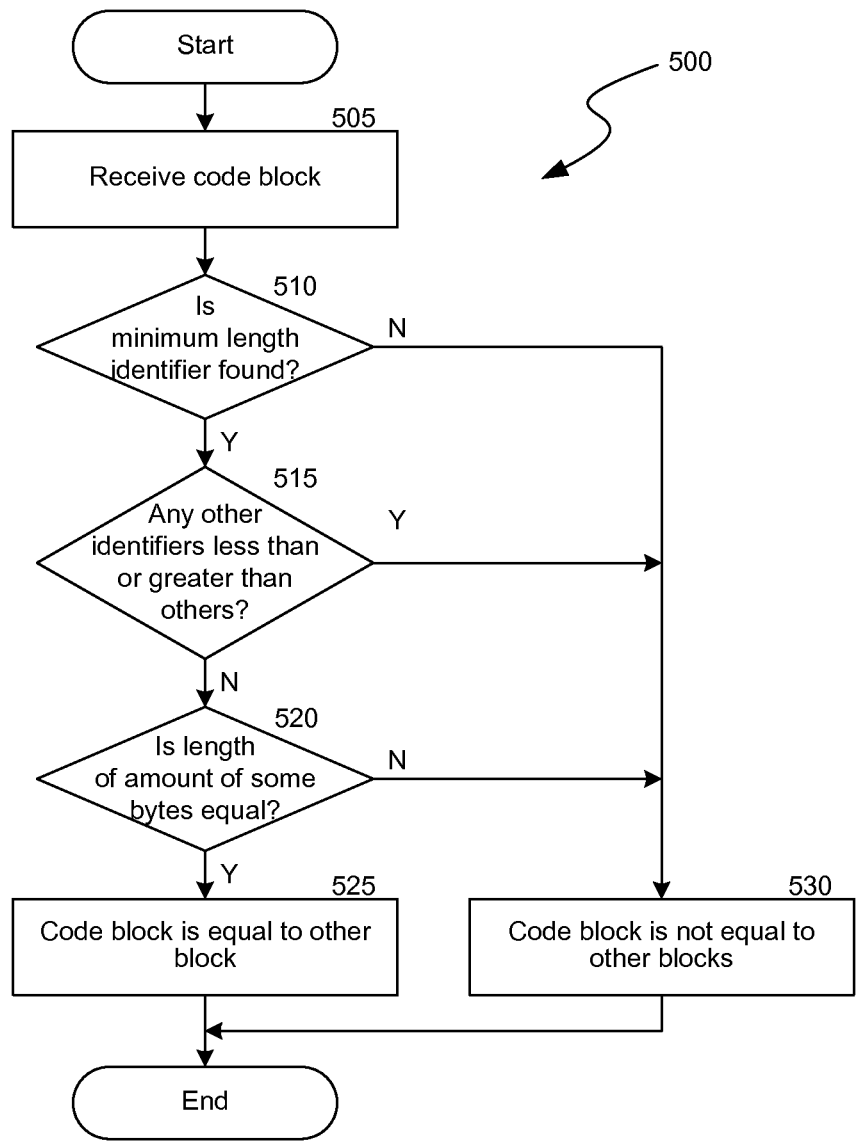
FIG. 5 is a flow diagram illustrating an example process for determining if a code block is equal to other code blocks.

In regards to the sort order in a tree: Whether one code block is less than another can be determined using an example process illustrated in FIG. 5. The process 500 begins at step 505 where a code block is received. At step 510 the minimum sequence length rolling hash of source bytes is compared to others in the search tree. If it is not found, then the process 500 continues to step 530, where it is determined that the code block is not equal to other code blocks. If the minimum sequence length rolling hash is found, the process continues to step 515. For overlapping power of 2 hashes, in order of lowest power of 2 hashes, a check for equality is made. If any is less or greater than the other, then the process 500 continues to step 530, where it is determined that the code block is not equal to other code blocks. Otherwise, the process 500 continues to step 520. If all are equal or no overlapping power of 2's found, then base the decision on the length of the amount of source bytes. If they are also equal, then the process continues to step 525, where the blocks are considered equal. If they are not equal, then the process 500 continues to step 530, where it is determined that the code block is not equal to other code blocks. The process 500 then ends.

Slight variations (such as taking into account other criteria such as the source length of the halfway mark in the block etc) are also possible.

Note that in the above, there are greater degrees of being not equal. Two blocks can totally mismatch, or they can match partially. The more power of 2 hashes that match, the better the match, even if they do not all match.

Data Storage

The following types of data should be stored on a physical data storage medium (e.g., a computer-readable storage medium): 1) search tree skip list base pointer list; 2) actual code blocks themselves; 3) pseudo code block containing a link inside a code block; and 4) skip list node block (pointer to previous and next skip list node, pointer to code block).

These different entities may be stored in various ways. What should be stored is what they contain and which code blocks refer to which other code blocks, and not necessarily how the data inside each block is stored. Each or any of the above may be stored separately. The code block should contain a number of code bytes going up to a small set maximum.

A code byte can either be a literal byte, or it can be a reference to another block. If it is a reference, the following data should be stored also: 1) block number (large number as there can be a large number of blocks); 2) offset inside block (this is small, will be a byte or less); 3) number of code bytes followed inside block (will be a byte or less); 4) number of source bytes contained (can be a large number); and 5) rolling hash of source bytes followed (usually 32 bits).

If, for example, 6 bytes are taken for the block number, 6 bytes for the number of source bytes followed, 4 bytes for the hash, and a byte each for codebyte offset and number of code bytes followed in block, then there are 18 bytes for the code byte—meaning that the sequence followed should be longer than 18 bytes source bytes.

The literal code bytes would need to be at least a bit extra in length (9 vs. 8 bits) in order to signify that they are in fact literals.

A pseudo block would contain the pointer to the other block, an offset measured in code bytes, an offset measured in source bytes and a differential rolling hash (which with modulo exponentiation can be used to calculate the power of 2 hashes of the pseudo block using the linked-to block's power of 2 hashes). Modular exponentiation is a type of exponentiation performed over a modulus.

The power of 2 hashes need not necessarily be stored, only one differential. This makes it light weight to store pseudo blocks in the search tree.

Populating the Search Tree

Figure 6:
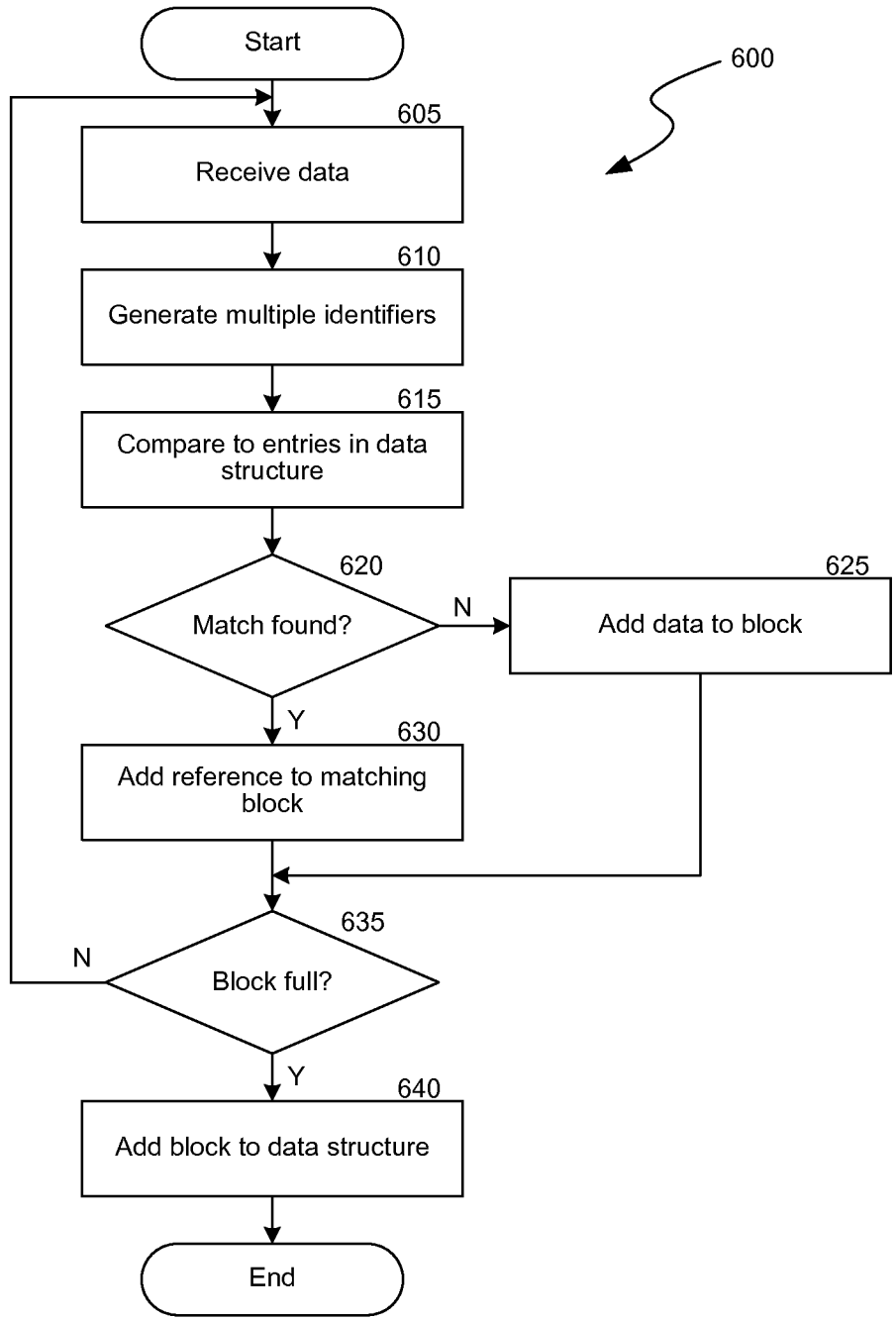
FIG. 6 is a flow diagram illustrating an example process for populating a data structure with code blocks.

FIG. 6 is a flow diagram illustrating an example process for populating a data structure with code blocks. The process begins at step 605, where an input stream of data is received. Given the input stream, at step 610, the hashes of the power of 2s are generated. This is an operation which generally requires minimal computational complexity since only the first and last bytes need to be added and/or removed.

At step 615, for each byte, it is looked up whether there exists an entry in the search tree matching the hash of the minimum sequence. At step 620, it is determined whether a match is found in the data structure. If found, then the comparison as mentioned earlier also features comparing the power of two hashes, the one matching the most number of power of 2 hashes is evaluated first.

By evaluating, what is meant is that matching code block is evaluated and expanded, code byte by code byte, and compared against the input stream. If the code byte is a reference, then the complete reference should match.

In some embodiments, the reference could be followed to a deeper level, for example, to a certain maximum level or to a maximum number of bytes. However in some embodiments, it was chosen not to go partially into a reference, either a reference has to hold and be equal exactly or the other choice is to use a code block until the previous code byte in the code block.

This is where the reference hash is used—by using modulo exponentiation, it is possible to reconstruct the hash of the code block up to the point directly after the reference and compare it to the rolling hash which was built while following the tree. Only if after a reference the hash still matches, is the link followed recursively and validated that it actually matches.

Even if there is a hash collision on a higher level, one level down is already usually the place where a hash of another link will no longer match.

The task of following the search tree can be split up into multiple threads where one thread starts looking up the input stream at location 0, the next thread at location 1, etc. If no match is found, it can go forward to an unprocessed location. If a match ends after less than a certain number of source bytes (for example, 18 or more, depending on various factors), then the thread can abort and also start from the beginning at an unprocessed location.

For threads, when they have a match greater than a certain amount of threshold source bytes (could be larger than the minimum), it could also reset the unprocessed location to that number, so that any threads not finding a match can start from that location. While that may not yield the optimal match, it may result in a match that is good enough.

If while going through a search tree, there are multiple candidates to follow, then it can be up to the implementation to decide whether the first tried path was good enough. If from the matching hashes it is expected that a candidate (perhaps to a hash collision) could be a better match than the one found, then it can be tried again.

As soon as a path is determined to be sufficient, all the block reference counters at this stage should be increased by one, also the references that are used following this.

At step 620, if no reference is found, then the literal byte is added to the current block. The process then continues to step 635. At step 635, if a reference is found, then one is added to the reference count of the block being referenced.

At step 635, it is determined if the bock is full. If not, the process 600 returns to step 605. Once the block is full, at step 640, the block is marked to be added to the search tree. The process 600 then concludes.

Second Level Pass

If a block that is marked to be added to a search tree contains multiple references in a row, and the total length of these references exceeds the block size of the incoming data, then it should be checked if there is not a block existing, which has all of the same references (one option is to first search for a block having matching hashes).

In some embodiments, the second level pass is performed as an optimization. If no replacement can be done on a block, then it is finalized and written to the search tree. The candidates for a second level pass could be marked while scanning if it is found that a large number of the power of 2's match, but it is not yet possible to match the remaining bytes. In such a case the potential match could be added to a buffer in memory and later checked.

Links to Within Code Blocks

While processing the input buffer, an LZW algorithm could be run on the data—not so much for actual compression of the data; but to find repetitions in the input stream. LZW is a lossless data compression algorithm.

Normally it is only possible to refer to the beginning of a code block; however with this mechanism it is possible to link inside of a code block starting at, for example, the 15th code byte rather than the first.

For a current input stream, it is known which blocks were created by the current input stream and so links inside those blocks can easily be constructed; if it is determined that a link is "useful enough," it could also be added to a search tree as a pseudo block.

"Useful enough" could be defined by saving a significant percentage of the input stream in that link. Note that the links themselves generally will not be referenced; only what the links link to will be referenced by other code blocks.

Output Data

The output will only be one reference to a block. All blocks that got added will be recorded in a separate block. If that block becomes full, it will itself be added as a block and a new block will be started which contains that block. One objective is that for each file stored, that there is one block. If a block is not full, it will only be stored but not linked to in the search tree.

An Example

Take the following string: "Present your card with every order and receive promotional discounts." An idea is to build a search tree and store the single instanceable data inside the search tree.

For sake of clarity, to describe the algorithm only blocks of 8 code words will be used. In some embodiments, blocks of 64, 128, 256 bytes or perhaps even higher may be used.

Given the string above, the following code blocks are generated. The top value (01 02) is just some file offset. The value "(sp)" means space character. Given an empty tree, there is not much that can be referenced, so the first few blocks look like the following:

```
01 02 03 04 05 06 07 08
 p  r  e  s  e  n  t (sp)
10 11 12 13 14    15 16
 y  o  u  r (sp)  c  a
```

-continued

| | | | | | | |
|---|---|---|---|---|---|---|
| 17 | 18 | 19 | 20 | 21 | 22 | 23 24 |
| r | d | (sp) | w | i | t | h (sp) |
| 25 | 26 | 27 | 28 | 29 | 30 | 31 32 |
| e | v | e | r | y | (sp) | a n |

All these are added to the search tree (sorted by the first four characters and then the power of 2 hashes and the length). The next block is able to make a reference if the LZW extension described above is used. This is possible because blocks 1, 10, 17 and 25 come from this instance for which an LZW table has been created.

The next block (33) would look something like: (blocks are named in this example after their storage location in this example, it could have been just as easy to use B1, B2, B3, B4, etc.)

| 33 | 34 | 35 36 37 | 38 | 39 | 40 |
|---|---|---|---|---|---|
| (->B17,1,2) | (->B02,1,2) | c e i | (->B25,1,2) | (sp) | (->B01,0,2) |
| d (sp) | r e | | ve | | pr |

The syntax for (->Bx, y,z) is: Reference to block x, offset y (starting at 0) and use z characters.

These references could be added to the search tree also by themselves. Certain criteria should be met, especially having been used in the past, and perhaps having been used a certain number of times or leading to a certain amount of data, or rank these the used links by a points system and for every file added, add the top x.

In this example, links used will be added as pseudo blocks.

So block 41 will be (->B17,1) (no length, just the start offset), block 42 will be (->B02,1), block 43 would be (-B25, 1).

Now an unfortunate case for block-level single instancing would be if this string: "Present your card with every order and receive promotional discounts."—was changed to—"resent your card with every order and receive promotional discounts." In other words, the first letter was deleted.

Here, for the first character there is already a link already going to (B02,1). So it is written (->B02, 1, 7) (7 characters), followed by the complete blocks B10,B17,B25 But even if this did not exist, B10, B17, B25 would have been used in any case. The seven characters would have needed to be written into a new block before the first reference.

Random Access

Each file links to one block. Each block has a half way marker and a value saying how many source bytes are left of the middle. Using this, and since blocks are short and each reference contains the amount of source bytes in the reference, it is trivial to follow exactly the right references to get to the exact offset that the user wants to—and it is done in O(log(n)). The reference stack would need to be saved in memory while the file handle to read from that location is active. Even without the halfway marker, the order of time would still be O(log(n)) for the seek but it would take twice as long as without the halfway marker as twice as much data would need to be read to determine in which reference the location desired to be sought to is contained in.

Modifying a File

In some embodiments, the design may perform optimally if files are written and then not modified again, however, it does still work though if files are modified—however some blocks, a logarithmic amount of the file may need to be rewritten.

Let's say the following situation exists:

| | | | |
|---|---|---|---|
| File -> B12 | | | |
| B9: | f | g | h |
| B10: | d | e | ->B9,0,3 |
| B12: | a ->B10,2,2 | c | |

Say the 'g' is to be changed to something else, say i. If B9 has only one reference, then it is easy as B12 must be the only one using it. Just replace it, however the block needs to get a new block sequence number. If it is referenced by others, then B9's reference count should be reduced by 1. Then, if 'fih' is looked up to see if it has a reference—if it does, it is noted, else 'fih' is added as a block and use that in the following step (x). Then, the stack is went up to B10—it is checked to see if that has other references, if so the recount is reduced and (d, e, B->x) is added as block y, else it is changed (and a new sequence number is assigned) and the process is completed. And so on. Changing 1 block could lead to around log n other blocks also having to change. In some embodiments, one rule that should be kept when performing the above operations is that one block can only reference another block if the sequence number of the referenced block is lower.

Reclaiming Space

Each block has a reference count and a sequence number, which only goes up, never down. The sequence number ensures that there will be no circular dependencies. A block should only reference a block with a lower sequence number. When a file is deleted, blocks need to be traversed, decreasing the reference count recursively. In some embodiments, the sequence number may go down.

However, this may be difficult to do in real time—so an implementation could do this offline or periodically rather than doing it right away. Even if a new file references blocks which had actually reached a reference count of 0 (but are still >1 in the tree), it would just add 1—when the periodic check does get to the block and reduces it by whatever amount, there will still be one left.

So what happens is that when a file is removed, only the blocks of the file block (the block which is directly linked to refer to the file) are added to a sorted list of blocks to reduce the reference count of and only that one block is reduced by 1—meaning that in most cases the reference count will become 0. If any of them are already in the list, the 'reduce count' is just increased by 1.

When this offline space recoverer is implemented, whenever a new block references a block, instead of directly increasing the count, it would have to check against this table and instead decrease the reduce count.

One implementation of the algorithm could be that the order in which this algorithm processes the blocks to reduce the reference count of could do it in order of sequence number. If there is a low water mark reached of items in the list, then the ones with the highest sequence numbers are processed until the watermark is reached at which point all the entries with the lowest sequence numbers are processed. This can be done continuously when a writer thread is idle.

When the reference count of a block has reached 0, then the storage space of the block can be reused. It is up to the implementation how to deal with management of free space. For example, one could have a number of n "free block" linked lists, and a random one of these n is chosen to add the free block to. The list could include block ranges.

Locking

If multiple writers are allowed to write to the single instanced storage at the same time, then locking should be done in a way so that the tree is only minimally affected. In fact locking should be such that reading from the tree should be able to continue happening while updating, for example, the reference count or adding new items.

The way locking is performed may not affect materially the described concepts as locking is only one aspect of the entire picture.

However, a method to lock would be to have a fixed number of writers at any one given moment which can than be extracted out into any number of writers which queue their data until a writer becomes available.

If there is only one writer writing to the single instance store, then no locking mechanism is needed, however, it has obvious advantages when multiple writers are allowed.

There are several types of locks. For example, Group 1: reference counter locks, which include a read lock which still allows increasing of the reference counters by others, but no decreases; and a reference count change lock, which allows other writers to still read the actual data block, but not the reference count. If determined that the block is usable, the writer needs to wait for the lock to clear.

There are also Group 2: pointer locks, which include an item pointer insert lock—put in place when a next/previous pointer needs to be updated. For most use cases, the tree can still be scanned while this is going on, just not other items inserted in the same place while the lock is in place; and an item pointer delete lock—put in place when a next/previous pointer needs to be updated because an element pointing to it will be deleted. If such a lock is in place, the writer needs to wait until the lock is released in order to go to the next/previous item.

There are also Group 3: block-level locks, which include a block lock—this is used to change an unused block into a used block. If this lock is detected, another block should be chosen by the writer to write the new data. These types of locks can be stored in memory or with the actual data.

Alternatives

One alternative is to do the following: Use macro blocks—128 KB (or other large block sizes)—but each macro block would be chopped up into small 2 kb micro blocks. These microblocks could have their hashes calculated in a rolling hash format as well as a strong hash such as SHA1 or MD5. These strong hashes could be put into a search tree sorted by the weaker rolling hashes. If there is a match, calculate the strong hash, compare it against the one in the tree and then single instance using the microblock in case of a match. If for a certain minimum amount of data there is no hash match, that becomes a new block. One possible requirement of this approach is that all 2048 bytes (or however big the block size is) need to match. Partial block matches are not possible.

One other possible requirement of this approach is that every single byte needs to do a lookup in the search tree. In the primary approach described herein, it is similar to following a triep data structure—the next byte to compare against is known and only if it does not match is it necessary to start searching in the tree again—and not necessarily from the root of the tree.

In the primary approach described herein, if a 1 GB file were to come up again, it would only need to reference 1 block (though this block would also increase the reference count of all blocks it refers to, but this would be done while scanning the search tree). In the primary approach described herein, the matching blocks would be found quite quickly, as blocks will be found matching all hashes exactly.

Possible Improvements

This concepts described herein depend on being quickly able to scan a search tree. It is possible for there to be improvements in this area.

Commercialization

Storage is growing exponentially—being able to reduce the storage required by both compression and single instancing at the same time is extremely valuable and saves money.

Any companies needing to store large amounts of data almost certainly store duplicates. The concepts described herein could be used by an operating system manufacturer creating a single instanced file system or by a backup to disk vendor. They could also be employed by database companies and search companies which need to store a lot of data which could repeat itself to minimize storage.

A memory only implementation of this is very viable and may work very well for storing texts/emails (especially when there is a whole email thread—the memory used for the whole thread using this method should only be only slightly larger than the last email in the thread).

Suitable Environment

FIG. 1 is a block diagram illustrating an environment 100 in which aspects of the invention may be configured to operate. The environment 100 includes one or more clients 102, a media agent 512, a single instance database 105 and a storage device 103. Each of the clients 102 is a computing device, examples of which are described herein. The clients 102 are connected to the media agent 512, which is also a computing device. The media agent 512 is connected to the single instance database 105, which is a data store, and to the storage device 103, which is also a data store. Both the single instance database 105 and the storage device 103 may be any type of storage suitable for storing data, such as Directly-Attached Storage (DAS) such as hard disks, storage devices in a Storage Area Network (SAN), e.g., a Fibre Channel SAN, an iSCSI SAN or other type of SAN, Network-Attached Storage (NAS), a tape library, or any other type of storage.

The media agent 512 includes various components that perform various functions. These components include a data object identification component 110, an identifier generation component 120, an identifier comparison component 125, and a criteria evaluation component 130. The file identification component 110 identifies files or data objects, such as in response to a storage operation. The identifier generation component 120 generates a substantially unique identifier for the file or data object (substantially unique identifiers are discussed in more detail below). The identifier comparison component 125 performs comparisons of substantially unique identifiers of various files or data objects to determine if the files or data objects contain similar data (for example, the identifier comparison component 130 can compare substantially unique identifiers of two or more files or data objects to determine if the files or data objects contain the same data; metadata such as access control lists (ACLs) of the two or more files or data objects may differ. The criteria evaluation component 130 evaluates aspects of files or data object against a set of criteria. The media agent 512 may also contain other components that perform other functions.

The clients 102, as part of their functioning, utilize data, which includes files, directories, metadata (e.g., ACLs and any other streams associated with the data), and other data objects. (More details as to the storage operations involving ACLs may be found in the assignee's U.S. patent application Ser. No. 12/058,518, entitled SYSTEM AND METHOD FOR STORAGE OPERATION ACCESS SECURITY, the entirety of which is incorporated by reference herein.) The data on the clients 102 is a primary copy (e.g., a production copy). During a copy, backup, archive or other storage operation, the clients 102 send a copy of each data object in the data to the media agent 512. The media agent 512 generates a substantially unique identifier (for example, a hash value, message digest, checksum, digital fingerprint, digital signature or other sequence of bytes that substantially uniquely identifies the file or data object) for each data object. The word "substantially" is used to modify the term "unique identifier" because algorithms used to produce hash values may result in collisions, where two different files or data objects result in the same hash value. However, depending upon the algorithm or cryptographic hash function used, collisions should be suitably rare and thus the identifier generated for a file or data object should be unique throughout the system.

After generating the substantially unique identifier for a data object, the media agent 512 determines whether it should be stored on the storage device 103. The storage device 103 stores a secondary copy (e.g., a backup copy) of the data of the clients 102. To determine this, the media agent 512 accesses the single instance database 105 to check if a copy or instance of the data object has already been stored on the storage device 103. The single instance database 105 utilizes one or more tables or other data structures to store the substantially unique identifiers of the data objects that have already been stored on the storage device 103. If a copy or instance of the data object has not already been stored on the storage device 103, the media agent 512 sends the copy of the data object to the storage device 103 for storage and adds its substantially unique identifier to the single instance database 105. If a copy or instance of the data object has already been stored, the media agent 512 can avoid sending another copy to the storage device 103. In this case, the media agent 512 may add a reference (e.g., to an index in the single instance database 105, such as by incrementing a reference count in the index) to the already stored instance of the data object. As explained below, adding a reference to the already stored instance of the data object enables storing only a single instance of the data object while still keeping track of other instances of the data object that do not need to be stored.

Instead of the clients 102 sending the data objects to the media agent 512 and the media agent 512 generating the substantially unique identifiers, the clients 102 can themselves generate a substantially unique identifier for each data object and transmit the substantially unique identifiers to the media agent 512 for lookup in the single instance database 105. If the media agent 512 determines that an instance of a data object has not already been stored on the storage device 103, the media agent 512 can instruct the client 102 to send it a copy of the data object, which it then stores on the storage device 103. Alternatively, the client 102 itself can send the copy of the data object to the storage device 103. More details as to the generation of the substantially unique identifiers may be found in the assignee's U.S. patent application Ser. No. 12/058,367, entitled SYSTEM AND METHOD FOR STORING REDUNDANT INFORMATION, the entirety of which is incorporated by reference herein.

The media agent 512 can support encrypted data objects. For example, one client 102 could generate a substantially unique identifier for a data object and then encrypt it using one encryption algorithm. Another client 102 could generate a substantially unique identifier for another data object and then encrypt it using another encryption algorithm. If the two data objects are identical (meaning the two objects have the same data, while their metadata, such as ACLs or descriptors, could be different), they will both have the same substantially unique identifier. The media agent 512 can then store both encrypted instances of the data object or only a single encrypted instance. The media agent 512 can also support compressed data objects. In general, the same compression algorithm may be used to compress data objects. Therefore, the media agent 512 can generate a substantially unique identifier for a data object before or after it has been compressed. More details as to how the media agent 512 can support encryption and compression in a single instancing system may be found in the assignee's U.S. patent application Ser. No. 12/145,342, entitled APPLICATION-AWARE AND REMOTE SINGLE INSTANCE DATA MANAGEMENT, the entirety of which is incorporated by reference herein.

Suitable System

Figure 2:
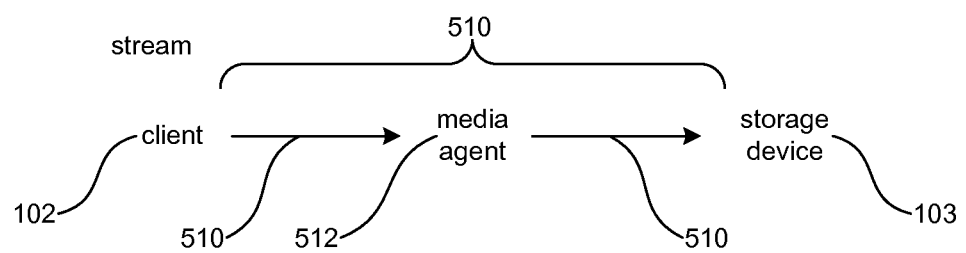
FIG. 2 is a block diagram illustrating components of a data stream that may be used in a suitable data storage system.

The above system may be incorporated within a data storage system and may be subjected to a data stream during a data copy operation. Referring to FIG. 2, a block diagram illustrating components of a data stream 510 utilized by a suitable data storage and recovery system is shown. The data stream 510 may include client 102, a media agent 512, and a storage device 103, such as a hard disk drive, an optical disk drive, a tape library, and/or a virtual tape library (VTL), etc. For example, in storage operations, the system may store, receive, and/or prepare data to be stored, copied, or backed up at a server or client. The system may then transfer the data to be stored to media agent 512, which may then refer to storage policies, schedule policies, and/retention policies (and other policies) to choose a storage device 103. The media agent 512 may include or be associated with an intermediate component, to be discussed herein.

The storage device 103 receives the data from the media agent 512 and stores the data as a secondary copy, such as a backup copy. Storage devices 103 may include magnetic tapes, optical disks, USB and other similar media, disk, and tape drives, and so on. Of course, the system may employ other configurations of data stream components not shown in FIG. 3.

Figure 3:
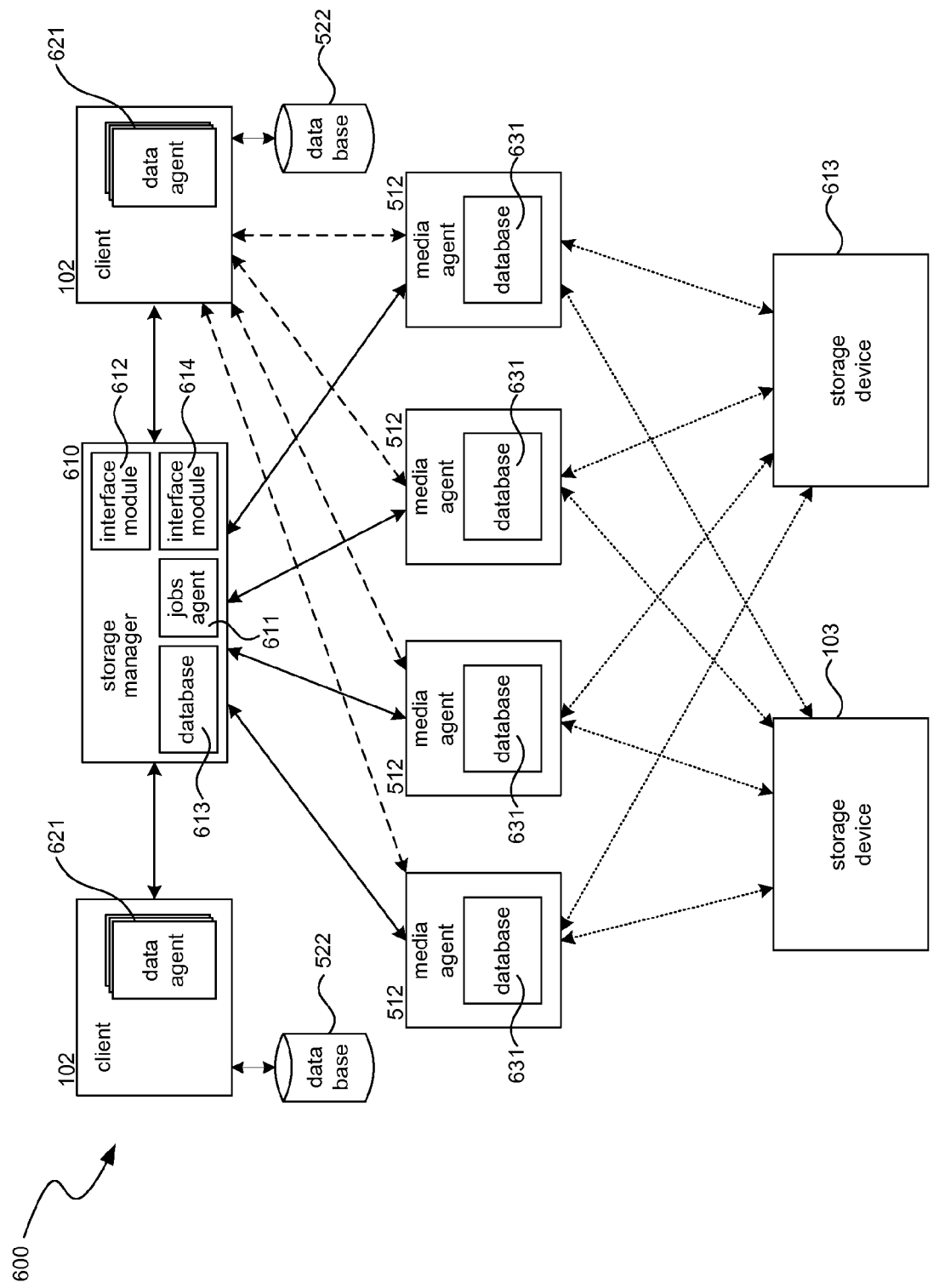
FIG. 3 is a block diagram illustrating an example of a suitable data storage system.

Referring to FIG. 3, a block diagram illustrating an example of a data storage and recovery system 600 is shown. Data storage systems may contain some or all of the following components, depending on the needs of the system. FIG. 3 and the discussion herein provide a brief, general description of a suitable computing environment in which the system can be implemented.

For example, the data storage system 600 contains a storage manager 610, one or more clients 102, one or more media agents 512, and one or more storage devices 103, 613. Storage manager 610 controls media agents 512, which may be responsible for transferring data to storage devices. Storage manager 610 includes a jobs agent 611, a management agent 612, a database 613, and/or an interface module 614. Storage manager 610 communicates with client(s) 102. One or more clients may access data that is stored by the system from database 622 via a data agent 621. The system uses media agents 512, which contain databases 631, to transfer and store data into storage devices. Client databases 622 may contain data files and other information, while media agent databases 631 may contain indices and other data structures that assist and implement the storage of data in storage devices 103, for example.

The data storage and recovery system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. Additionally, some resources may create indices and other tables relied upon by the data storage system and other data recovery systems. The secondary copies may include snapshot copies and associated indices, but may also include other backup copies such as Hierarchical Storage Management (HSM) copies, archive copies, and so on. The resources may also perform storage management functions that may communicate information to higher level components, such as global management resources.

In some examples, the system performs storage operations based on storage policies, as mentioned above. For example, a storage policy includes a set of preferences or other criteria to be considered during storage operations. The storage policy may determine or define a storage location and/or set of preferences about how the system transfers data to the location and what processes the system performs on the data before, during, or after the data transfer. In some cases, a storage policy may define a logical bucket in which to transfer, store, or copy data from a source to a data store, such as storage media. Storage policies may be stored in storage manager 610, or may be stored in other resources, such as a global manager, a media agent, and so on. Further details regarding storage management and resources for storage management will now be discussed.

Figure 4:
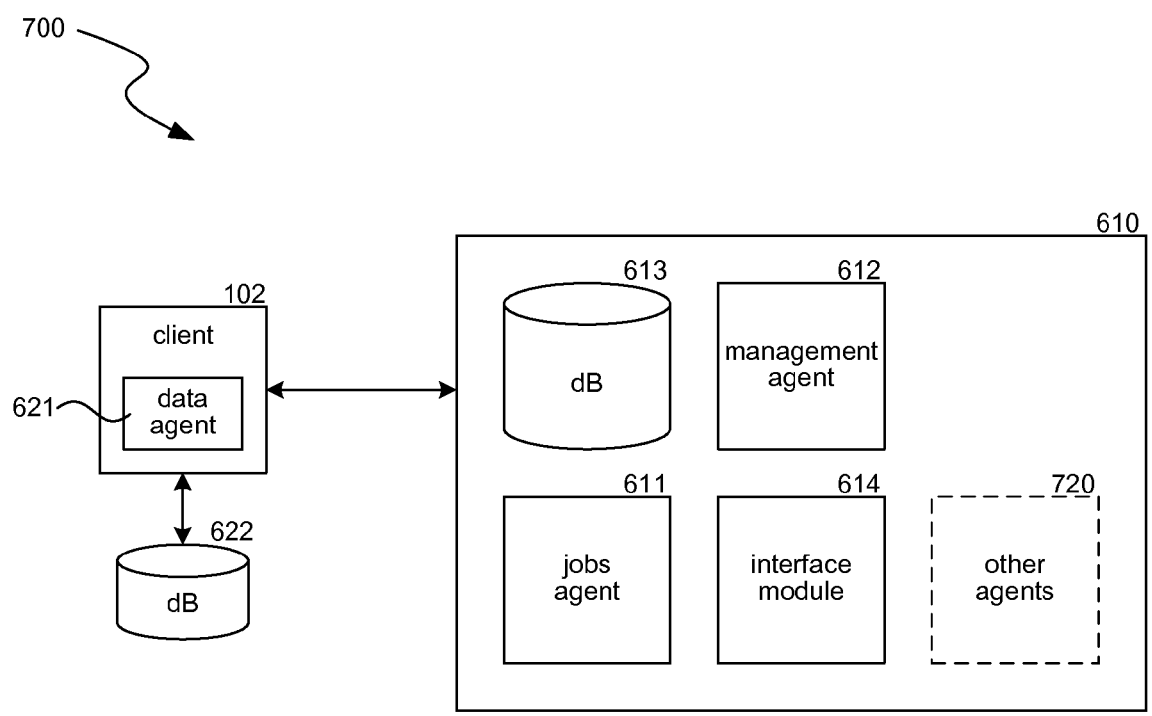
FIG. 4 is block diagram illustrating an example of components of a computing device used in data storage operations.

Referring to FIG. 4, a block diagram illustrating an example of components of a server or system 700 used in data storage operations is shown. A server, such as storage manager 610, may communicate with clients 102 to determine data to be copied to storage media. As described above, the storage manager 610 may contain a jobs agent 611, a management agent 612, a database 613, an interface module 614, and/or other agents 720. Jobs agent 611 may manage and control the scheduling of jobs (such as copying data files) from clients 102 to media agents 512 (not shown). Management agent 612 may control the overall functionality and processes of the data storage system or may communicate with global managers. Database 613 or another data structure may store storage policies, schedule policies, retention policies, or other information, such as historical storage statistics, storage trend statistics, and so on. Interface module 615 may interact with a user interface, enabling the system to present information to administrators and receive feedback or other input from the administrators or with other components of the system (such as via Application Programming Interfaces (APIs)).

Conclusion

From the foregoing, it will be appreciated that specific examples of techniques for single instancing may have been described herein for purposes of illustration, but that various modifications may be made without deviating from the spirit and scope of the invention. As an example, although certain types of data storage operations may have been described, the system may be used to perform many types of storage operations (e.g., copy operations, backup operations, restore operations, archival operations, copy operations, continuous data replication (CDR) operations, recovery operations, migration operations, HSM operations, etc.). As another example, although it is described that for each byte in an input stream, it is looked up whether there exists an entry in the search tree matching the hash of the minimum sequence, this lookup may be performed for not every byte in the input stream.

More details as to single instancing may be found in one or more of the following commonly-assigned U.S. patent applications: 1) U.S. Pat. App. No. 61/180,791 (entitled BLOCK-LEVEL SINGLE INSTANCING, U.S. patent application Ser. No. 12/145,347 (entitled APPLICATION-AWARE AND REMOTE SINGLE INSTANCE DATA MANAGEMENT; or 3) U.S. patent application Ser. No. 12/145,342 (entitled APPLICATION-AWARE AND REMOTE SINGLE INSTANCE DATA MANAGEMENT, 4) U.S. patent application Ser. No. 11/963,623 (entitled SYSTEM AND METHOD FOR STORING REDUNDANT INFORMATION; 5) U.S. patent application Ser. No. 11/950,376 (entitled SYSTEMS AND METHODS FOR CREATING COPIES OF DATA SUCH AS ARCHIVE COPIES; or 6) U.S. Pat App. No. 61/100,686 (entitled SYSTEMS AND METHODS FOR MANAGING SINGLE INSTANCING DATA, each of which is incorporated by reference herein in its entirety. Variable instancing generally refers to storing in secondary storage one or more instances, but fewer than the total number of instances, of each data block (or data object) in a set of data (e.g., primary data). More details as to variable instancing may be found in the commonly-assigned U.S. Pat. App. No. 61/164,803 (entitled STORING A VARIABLE NUMBER OF INSTANCES OF DATA OBJECTS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the applicant contemplates the various aspects of the invention in any number of claim forms. For example, if one aspect of the invention is recited as a means-plus-function claim under 35 U.S.C §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to add additional claims after filing the application to pursue such additional claim forms for other aspects of the invention.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method of deduplicating data performed by one or more computing systems which are coupled to one or more storage devices via a network, wherein the one or more computing system each comprise at least one processor and memory, and the one or more storage devices include a searchable data structure and a first set of data, the method comprising:
    receiving a second set of data;
    dividing the second set of data into at least one block, wherein the one block includes a total number of bytes;
    accessing the searchable data structure;
    determining whether one or more bytes of the one block are included in a portion of the first set of data in the searchable data structure,
        wherein the number of the one or more bytes is less than the total number of bytes of the one block;
    replacing the one or more bytes with a reference to the portion of the first set of data when the one or more bytes of the one block are included in the portion of the first set of data in the searchable data structure; and
    causing the one block to be stored using the one or more storage devices.

2. The method of claim 1, further comprising generating powers of 2 rolling hashes for the second set of data.

3. The method of claim 1,
    wherein the searchable data structure includes a hierarchical data structure that includes multiple nodes, and
    wherein a first node can reference data in any other node excepting nodes that are descendants of the first node.

4. The method of claim 1, further comprising compressing the second set of data.

5. A system for deduplicating data, the system comprising:
    at least one processor;
    memory communicatively coupled to the at least one processor;
    means for receiving a file including multiple bytes;
    means for accessing at least some of multiple blocks of data in a data structure:
        wherein the multiple blocks of data have a first size,
        wherein the multiple blocks of data represent a set of data having a second size that is greater than the first size,
        wherein a block of data is associated with multiple first identifiers, and
        wherein the multiple blocks of data are identified in the data structure by the associated multiple first identifiers;
    means for determining whether one or more of the multiple bytes are already stored based at least partly upon accessing of the data structure,
        wherein the number of the one or more bytes is less than a number of bytes in a block of data; and
    means for causing bytes that are not already stored using a storage device to be stored.

6. The system of claim 5, further comprising
    means for generating multiple second identifiers for the file,
    wherein the multiple second identifiers for the file include powers of 2 rolling hashes.

7. The system of claim 5, further comprising
    means for generating multiple second identifiers for the file,
    wherein the multiple second identifiers include powers of 2 rolling hashes, and
    wherein means for determining whether the one or more of the multiple bytes are already stored includes means for comparing the multiple second identifiers for the file with the multiple first identifiers associated with the multiple blocks of data.

8. The system of claim 5,
    wherein the data structure includes a hierarchical data structure that includes multiple nodes, and
    wherein a first node can reference data in any other node excepting nodes that are descendants of the first node.

9. The system of claim 5 wherein at least some of the multiple blocks of data are compressed.

10. A method of deduplicating data performed by a computing system having a processor and memory, the method comprising:
    dividing a first set of data into at least one block, wherein the one block includes a total number of bytes;
    accessing a searchable data structure, wherein the searchable data structure includes a second set of data;
    determining whether one or more bytes of the one block are included in a portion of the second set of data in the searchable data structure,
        wherein the number of the one or more bytes is less than the total number of bytes of the one block;
    replacing the one or more bytes with a reference to the portion of the second set of data, when the one or more bytes of the one block are included in the portion of the second set of data in the searchable data structure; and causing the block to be stored.

11. The method of claim 10, further comprising generating powers of 2 rolling hashes.

12. The method of claim 10,
wherein the searchable data structure includes a hierarchical data structure that includes multiple nodes, and
wherein a first node can reference data in any other node excepting nodes that are descendants of the first node.

13. The method of claim 10, further comprising compressing data.

14. A method of building a search data structure for deduplicating data, wherein the method is performed by a computing system having a processor and memory, the method comprising:
receiving a set of data;
dividing the set of data into at least a first block,
wherein the first block includes a number of bytes;
accessing a search data structure containing zero or more nodes,
wherein each node represents a block including the number of bytes or represents a portion of a block, and
wherein each node contains a reference to a stored block, to a portion of a stored block, or to another node;
first determining whether the first block is identical to a second block represented by a first node in the search data structure;
when a result of the first determining is positive,
creating a node in the search data structure representing the first block and containing a reference to the first node; and
when a result of the first determining is negative:
second determining whether a portion of the first block is identical to a portion of a third block represented by a second node in the search data structure;
when a result of the second determining is positive:
storing a portion of the first block that is not identical to the portion of the third block;
creating a third node in the search data structure representing the portion of the third block and containing a reference to the stored portion of the third block; and
creating a node in the search data structure representing the first block and containing a reference to the third node and a reference to the stored portion of the first block; and
when a result of the second determining is negative, storing the first block;
creating a node in the search data structure representing the first block and containing a reference to the stored first block.

15. The method of claim 14, wherein the search data structure is implemented as a skipped list or a red-black tree.

16. The method of claim 14, wherein a reference to a portion of a stored block comprises a reference to the stored block, an offset within the stored block, and a length.

17. The method of claim 14, wherein each node in the search data structure contains metadata, including a number of references to the node or a hash code.

18. The method claim 17,
wherein when a node contains a reference to a stored block or a portion of a stored block, the hash code is computed from the stored block or the portion of the stored block, and
wherein when a node contains a reference to another node, the hash code is computed from a stored block or a portion of a stored block to which the reference is resolved.

19. The method of claim 18,
wherein the first determining is performed based on the hash code contained in the first block and the hash code contained in the second block, and
wherein the second determining is performed using the hash code contained in the first block and the hash code contained in the third block.

20. The method of claim 17, wherein the number of references to a third node is updated when a node that contains a reference to the third node is added to or deleted from the search data structure.

* * * * *

UNITED STATES PATENT AND TRADEMARK OFFICE
CERTIFICATE OF CORRECTION

| | | |
|---|---|---|
| PATENT NO. | : 9,158,787 B2 | Page 1 of 1 |
| APPLICATION NO. | : 14/276622 | |
| DATED | : October 13, 2015 | |
| INVENTOR(S) | : Michael F. Klose | |

It is certified that error appears in the above-identified patent and that said Letters Patent is hereby corrected as shown below:

On The Title Page, Item (56) References Cited

On the page 4, in column 1, under "Other Publications", line 26, delete "hhttp://" and insert -- http:// --, therefor.

On the page 4, in column 1, under "Other Publications", line 30-31, delete /f aq/" and insert -- /faq/ --, therefor.

In The Specification

In column 9, line 35-36, delete "(-B25,1)." and insert -- (->B25,1). --, therefor.

In column 9, line 44, delete "B25 But" and insert -- B25..... But --, therefor.

In column 11, line 10, delete "than" and insert -- then --, therefor.

In column 11, line 57, delete "triep" and insert -- treap --, therefor.

In column 15, line 64, delete "INSTANCING, U.S." and insert -- INSTANCING); 2) U.S. --, therefor.

In column 15, line 66, delete "MANAGEMENT;" and insert -- MANAGEMENT); --, therefor.

In column 16, line 2, delete "MANAGEMENT," and insert -- MANAGEMENT); --, therefor.

In column 16, line 4-5, delete "INFORMATION;" and insert -- INFORMATION); --, therefor.

In column 16, line 7, delete "COPIES;" and insert -- COPIES); --, therefor.

In column 16, line 9, delete "DATA," and insert -- DATA); --, therefor.

In column 16, line 17, delete "OBJECTS." and insert -- OBJECTS). --, therefor.

In The Claims

In column 20, line 21, in claim 18, delete "method claim" and insert -- method of claim --, therefor.

Signed and Sealed this
Twenty-ninth Day of March, 2016

Michelle K. Lee
*Director of the United States Patent and Trademark Office*